US005509554A

United States Patent [19]
Samuelson et al.

[11] Patent Number: 5,509,554
[45] Date of Patent: Apr. 23, 1996

[54] SACRIFICIAL STRUCTURE MASKING METHOD FOR DISK DRIVE SLIDER ASSEMBLIES AND SLIDERS MADE THEREBY

[75] Inventors: Laurence S. Samuelson, San Jose; Robin L. Almes, Sunnyvale, both of Calif.; Michael J. Murtagh, Ingelheim, Germany

[73] Assignee: International Business Machines Corporation, Armonk, N.Y.

[21] Appl. No.: 339,005

[22] Filed: Nov. 14, 1994

[51] Int. Cl.⁶ .................................................. B44C 1/22
[52] U.S. Cl. .................... 216/22; 29/603.03; 29/603.12; 216/27; 360/103
[58] Field of Search ................................ 29/603; 216/22, 216/27; 360/103, 122

[56] References Cited

U.S. PATENT DOCUMENTS

| | | | |
|---|---|---|---|
| 4,333,229 | 6/1982 | Ellenberger | 29/603 |
| 4,948,460 | 8/1990 | Sandaiji et al. | 216/22 X |
| 5,095,613 | 3/1992 | Hussinger et al. | 29/603 |
| 5,104,483 | 4/1992 | Takeya | 216/22 |

*Primary Examiner*—William Powell
*Attorney, Agent, or Firm*—Merchant, Gould, Smith, Edell, Welter & Schmidt

[57] ABSTRACT

A sacrificial structure masking method for disk drive slider assemblies. Pico size air bearing surfaces (ABS) for sliders are created by mounting parallel slider rows into a carrier. The ABS are then established by positioning a mask having a sacrificial structure within the slider area, over the carrier and/or along cut zones between individual sliders. Once the masks are positioned, the carrier is exposed to transfer the pattern to the slider rows. The mask is then removed and the exposed area is etched from the slider rows. After the etching process, the masked portion of the slider is raised slightly to form the air bearing surfaces. Where a rear sacrificial structure is positioned over the carrier, no remnant is left on the slider surface after the etching step. However, sacrificial structures positioned within the slider area must be removed by a subsequent process step. The slider rows are then cut to form individual sliders. Slider features can also be formed by placing the sacrificial structures solely over the carrier and along the slider cut zones. The sacrificial structures along the cut zones are removed by the cutting process.

22 Claims, 7 Drawing Sheets

SACRIFICIAL STRUCTURE MASKING METHOD FOR DISK DRIVE SLIDER ASSEMBLIES AND SLIDERS MADE THEREBY

BACKGROUND OF THE INVENTION

1. Field of the Invention

This invention relates in general to a method of manufacturing thin film electromagnetic flying head assemblies, and more particularly, to a method of providing adhesion support during the photolithography process used for defining the air bearing surface geometry of sliders while decreasing air bearing rail and/or pad surface areas and maximizing profit and productivity.

2. Description of Related Art

Disk drive systems are widely used to store data and software for computer systems. A disk drive system generally includes a disk storage media mounted on a spindle such that the disk can rotate thereby permitting an electromagnetic head mounted on a movable arm to read and write information thereon. Data read/write operations are performed by positioning the head to a selected radial position on the surface of the rotating disk. There the head reads or writes data in the form of magnetized regions on the platter coating.

The electromagnetic head for a disk drive system is usually mounted in a carrier called a "slider." The slider serves to support the head and any electrical connections between the head and the rest of the disk drive system. The skew slider maintains a uniform distance from the surface of the rotating disk to prevent the head from undesirably contacting the disk. This is accomplished by incorporating aerodynamic features into the slider that causes the slider to glide above the disk surface over the moving air.

Computer users constantly hunger for more and more data-storage capacity. Thus, disk drive makers are forever trying to increase the storage capacity of their products. They are also constantly trying to minimize the actual, physical size of those drives. The accomplishment of these goals requires both shrinking the spacing of the cylinders so that more data can fit on a disk and squeezing bits more closely together on the tracks. Thus, disk drive manufacturers must develop heads that are narrower or that record narrower tracks.

Another very important parameter is the height at which the head flies above the surface of the platter. The magnetic field pattern around the gap in the head spreads and weakens very rapidly with distance away from the gap. Because the relevant distance is from the gap to the magnetizable platter coating, the design must include both the air gap (the actual height at which the head flies above the upper surface of the platter) and the thickness of any protective or lubricating overcoating that may have been applied to the platter. Thus, disk drive manufacturers must develop ways of minimizing the height at which the head flies above the disk surface.

One example of the fabrication of a thin film head/slider combination is U.S. Pat. No. 5,095,613, issued Mar. 17, 1992, to Hussinger et al., entitled "THIN FILM HEAD SLIDER FABRICATION PROCESS", incorporated herein by reference, which discloses fabricating a head assembly from a bar on which electromagnetic devices are provided as a single row and with like orientation. The bar is integral along a second surface with an adjacent substrate portion. The bar is anchored to a fixture. Head assemblies are formed along the bar where immediately thereafter the individual head assemblies are separated. Then, the surface of the electromagnetic devices are exposed and processed. Finally, the exposed surface is lapped and ground until a desired throat height of the poles and a desired contour of the bar are obtained.

Another method of fabricating thin film head/slider combination is U.S. Pat. No. 4,333,229, issued Jun. 8, 1982, to Michael L. Ellenberger, entitled "METHOD OF MANUFACTURING THIN FILM MAGNETIC HEAD/SLIDER COMBINATION", incorporated herein by reference, which discloses depositing transducers onto a substrate member adjacent a finished and lapped surface in a manner such that no further lapping of the slider rail adjacent the transducer is required. The method includes forming recesses on the substrate member to define slider rails and then forming air bearing surfaces on each rail.

While each of the above patents discloses methods for forming the air bearing surfaces on the slider, the air bearing surface areas are still too large to meet the current nominal head/disk spacing requirements. The air bearing surface area is proportional to slider flying height. In order to reduce the head/disk spacing, slider air bearing surface geometry features must therefore become smaller and more intricate. As the nominal head/disk spacing requirements shrink for each new product, air bearing rail and/or pad surface areas must also become smaller. Furthermore, zone bit recording technology makes it desirable for the head/disk spacing to remain constant across all disk radii.

Air bearing surface geometries which can achieve the required insensitivity to the varying velocity and skew ranges are necessarily complex. And as the overall slider dimensions are reduced from nano to pico sizes and smaller to facilitate cost and productivity gains, the slider air bearing surface (ABS) features must also be proportionately scaled.

The definition of these smaller and complicated ABS features presents a challenge to the photolithography process. The depth requirements of the slider etching requires the use of a thick photoresist layer. But the small intricate ABS features provide an extremely small footprint for resist adhesion to the slider row surface. As a result, the exposed photoresist is extremely susceptible to chipping and flaking off during later processing and handling. If the resist has broken off the slider surface, the etching process will not define the ABS properly resulting in missing features and damaged rail surfaces.

Since sliders with these etch defects represent a significant risk to file reliability, it is necessary to implement costly inspection procedures to prevent shipment of these parts. Furthermore, materials costs are increased and manufacturing capacity is stressed due to yield losses. Therefore, it is necessary to implement a scheme to enhance photoresist adhesion and resistance to damage.

Therefore, it can be seen that there is a need for a method for etching small air bearing surfaces geometries for disk drive slider assemblies.

It can also be seen that there is a need for a method for aiding adhesion of masks to define small features on a transducer carrying slider.

It can also be seen that there is a need for a disk drive system where the head assembly has a transducer carrying slider fabricated with nano, pico or smaller size air bearing surfaces.

Finally, it can also be seen that there is a need for a slider fabrication method that prevents the chipping and flaking off of the photoresist during processing and handling.

SUMMARY OF THE INVENTION

To overcome the limitations in the prior art described above, and to overcome other limitations that will become apparent upon reading and understanding the present specification, the present invention discloses a sacrificial structure masking method for disk drive slider assemblies.

The present invention solves the above-described problems by providing a method for creating small, intricate air bearing surfaces for sliders by using sacrificial mask features that facilitate the adhesion thereto.

A method in accordance with the principles of the present invention includes mounting multiple, parallel slider rows into a carrier. Small pads are established by positioning a mask having a sacrificial structure either within the slider area, over the carrier, and/or within slider cut zones. Once the photolithography masks are positioned over the slider rows and carrier, the photoresist is developed, the photolithography mask is removed, and the exposed area is etched from the slider row. After the etching process, the portions of the slider which were covered by the masks are raised slightly to form the air bearing surfaces. In one embodiment where the sacrificial structure is contained completely within areas outside the slider row, no remnant is left on the slider surface after the etching step. However, where a sacrificial structure is positioned within the slider area, the sacrificial structure is removed by a subsequent process step, such as machining, grading, or another etching step. Individual sliders are created by cutting the slider rows along slider cut zones. Sacrificial structures can also be formed within these cutting zones thereby allowing the removal of the sacrificial structures by the cutting process.

One aspect of the present invention is that a method for preventing the chipping and flaking off of the photoresist during the processing and handling of sliders is provided.

Another aspect of the present invention is that the adhesion of masks used to define small features on a transducer carrying slider is facilitated.

Another aspect of the present invention is that sacrificial structures are used to adhere photoresists to the slider and carrier during the formation of small features on sliders.

Another aspect of the present invention is that sacrificial structures may be used for alignment and/or test cites.

Yet another aspect of the present invention is that once the small features are formed on the sliders, the sacrificial structure is removed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

This invention describes the use of larger, sacrificial structures to provide adhesion support to the ABS defining photoresist. However, it is to be understood that the use of the sacrificial structures are not limited to providing adhesion support of the ABS defining photoresist. Those skilled in the art will recognize that the sacrificial structures may also be used as alignment aids or test cites during the fabrication process without departing from the invention.

Figure 1:
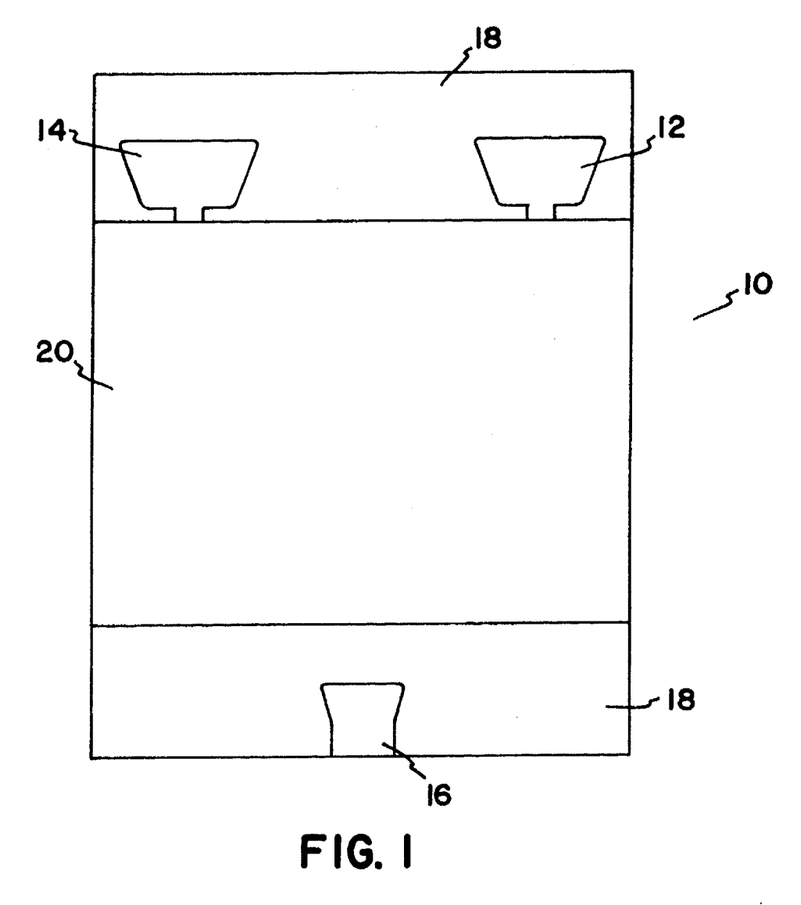
FIG. 1 is an example of a slider fabricated according to the present invention.

The use of these sacrificial features is shown in the attached figures. FIG. 1 illustrates an air bearing geometry for a proposed slider design 10 fabricated according to the method of the present invention. The slider has three individual pads 12, 14, 16 defined by a shallow etch 18, and a larger, deep etched portion 20 in the center of the slider. Thus, the shallow etched sections 18 form a slider rail with the three individual pads 12, 14, 16 serving as the air bearing surfaces (ABS).

The three isolated pads 12, 14, 16 are small, and photoresist adhesion presents a challenge to the photolithography process. A thick photoresist layer must be used during the etching process to achieve the required profile for the pads 12, 14, 16 and the deep center recess 20. But the small intricate ABS features provide an extremely small footprint for resist adhesion to the slider row surface. As a result, the exposed photoresist is extremely susceptible to chipping and flaking off during later processing and handling. Further, if the resist has broken off the slider surface, the etching process will not define the ABS properly resulting in missing features and damaged rail surfaces. Therefore, the photoresist pattern shown in FIG. 2 is created (the photoresist is shown by the crosshatched areas).

Figure 2:
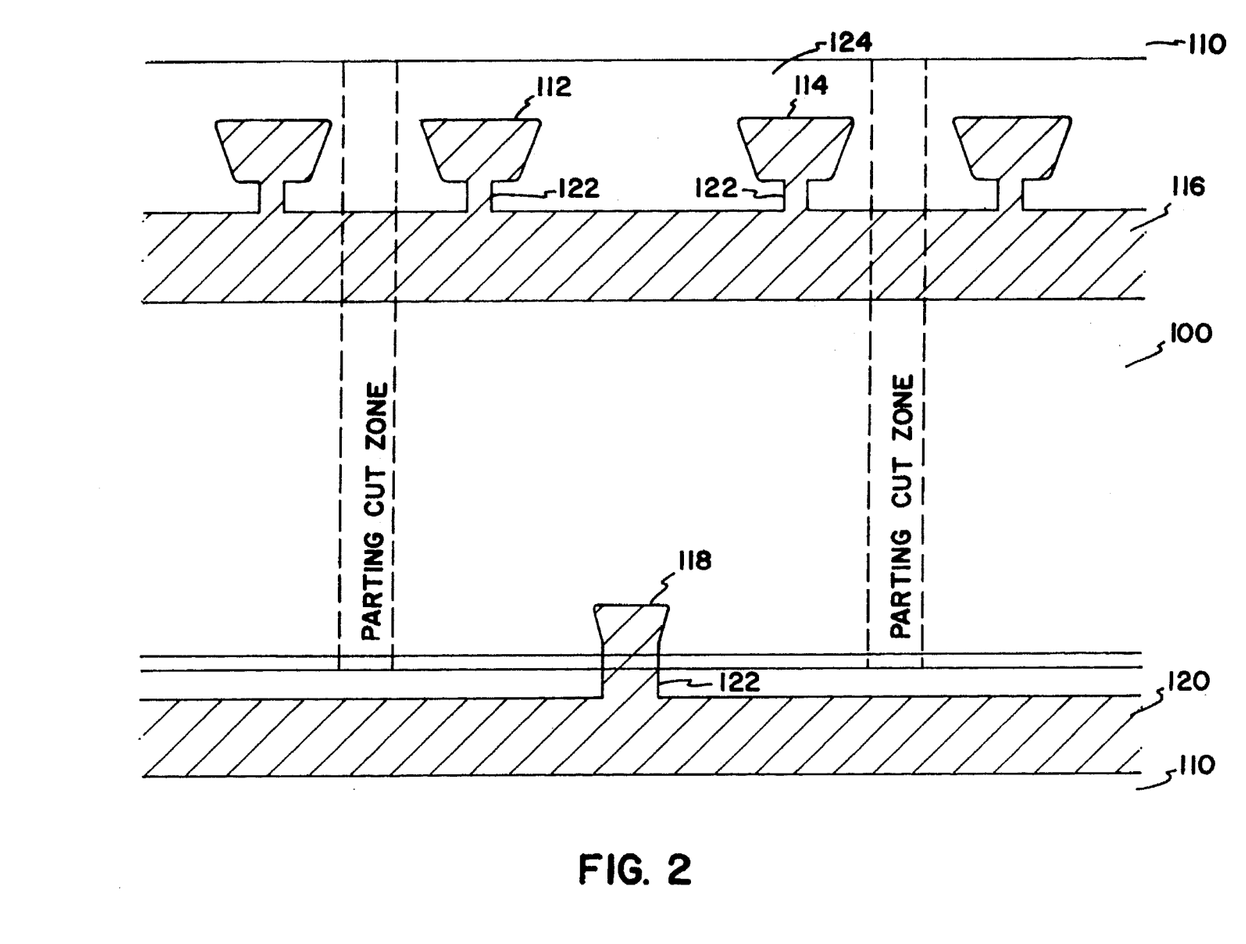
FIG. 2 shows the first step in the photolithography process for producing air bearing pads on a slider according to the present invention.

FIG. 2 illustrates a portion of a single slider row 100 loaded into a carrier fixture 110 prior to the etching process. However, the carrier 110 is capable of supporting several parallel slider rows 100. The two front small pads 112, 114 are supported by a sacrificial structure 116 contained within the slider area 100. The rear pad 118 is supported by a sacrificial structure 120 adhering to the carrier 110. The connectors 122 between the ABS defining photoresist and the sacrificial structures can simply be extensions (as shown for the rear pad 118) or narrow "isthmuses" when it is desired to keep the pad area to a minimum (as illustrated for the front pads 112, 114). The surface area of the pads is proportional to the upward pressure which the moving air exerts on the slider. Thus, the small ABS will allow the slider to fly closer to the surface of the platter. Once the photolithography masks 116, 120 are positioned over the slider row 100 and carrier 110, the photoresist is developed, the photolithography mask is removed, and the photoresist is etched from the slider row. Those skilled in the art will readily recognize that positive or negative photoresist and mask combinations may be used to expose the aperture pattern.

After the etching process, the portion of the slider which was covered by the masks 116, 120 is raised slightly relative to the etched regions 124 to form the air bearing surfaces. Once the slider has been etched, the rear sacrificial structure is of no concern as it leaves no remnant on the slider surface. The front sacrificial structure is removed by the subsequent deep etching step, illustrated in FIG. 3 below.

Figure 3:
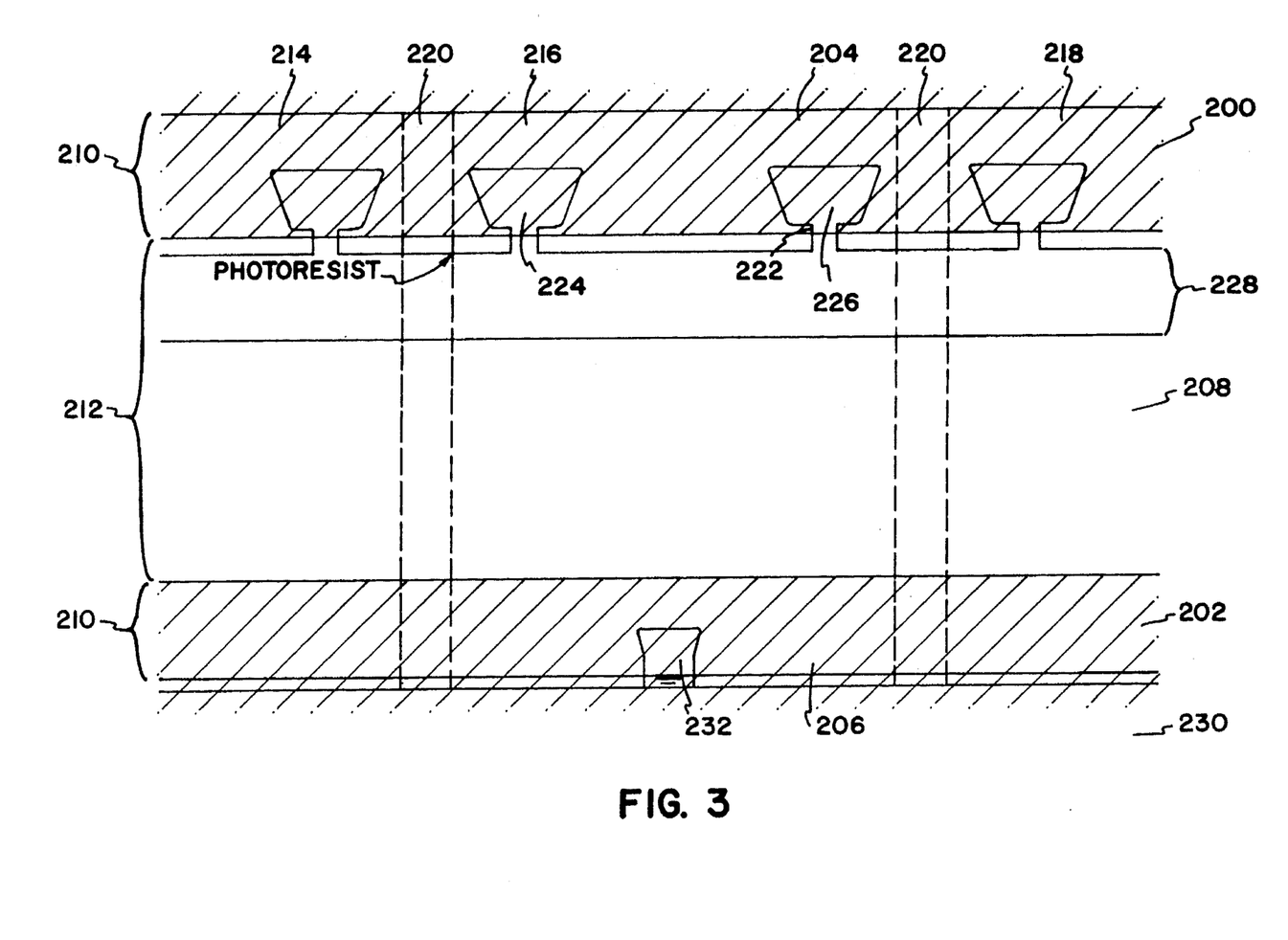
FIG. 3 shows the second photolithography step for removing the sacrificial structures on a slider according to the present invention.

In FIG. 3, masks 200, 202 are positioned over the top 204 and bottom 206 of the slider row 208 to form the slider rails 210. The central portion 212 of the slider row 208 is then exposed. The masks 200, 202 are removed and the exposed portion 212 of the slider row 208 is etched away thereby forming a deep central recess 212. Then individual sliders 214, 216, 218 are formed by cutting along the slider cut zones 220. It should be noted that the remaining traces of the "isthmuses" 222 on the front pads 224, 226 are small, and do not significantly affect the air bearing performance (although the geometry should be considered when defining the pad sizes). Furthermore, it may not be fully necessary to remove the sacrificial structures 228, but to merely etch it to a depth where it does not significantly impact the air bearing performance.

Figure 4:
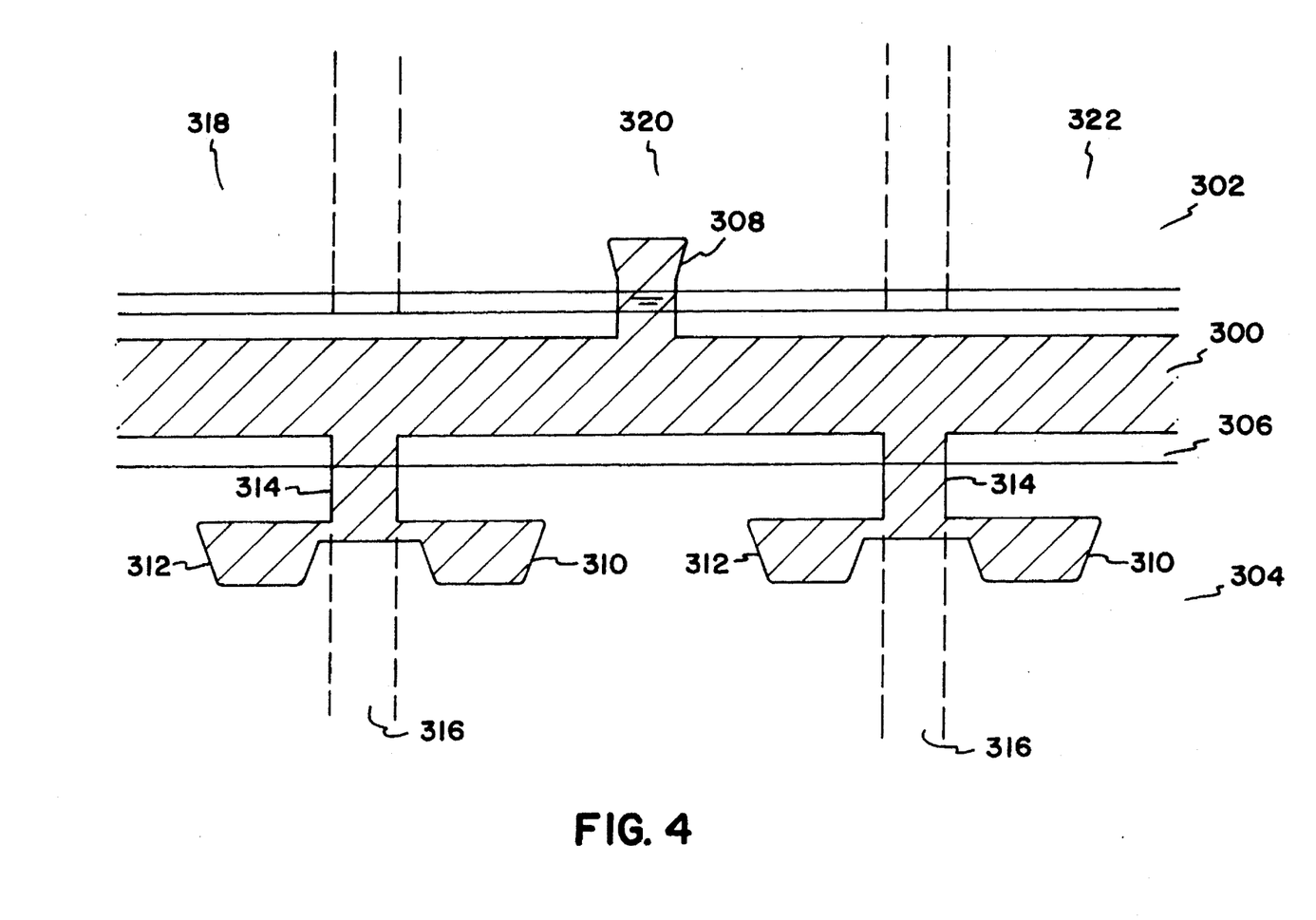
FIG. 4 is an alternative method for producing air bearing pads on a slider using the photolithography process according to the present invention.

FIG. 4 shows an alternative pattern for the sacrificial structure 300. Here portions of two slider rows 302, 304 are shown for illustration. The photoresist pattern defines a sacrificial structure 300 on the carrier 306 between the rows 302, 304 which supports the rear pad 308. The front pads 310, 312 are supported by structures 314 which lie in the zone 316 between adjacent sliders 318, 320, 322. Once etched, the structure 300 supporting the rear pad 308 on the carrier 306 is removed with no trace. The remaining sacrificial structure 314 for the front pads 310, 312 is removed by the machining saw when the row is cut into individual sliders 318, 320,, 322. The width 316 of the sacrificial structure 314 for the front pads is selected to match the width of the blade of the machining saw.

Figure 5:
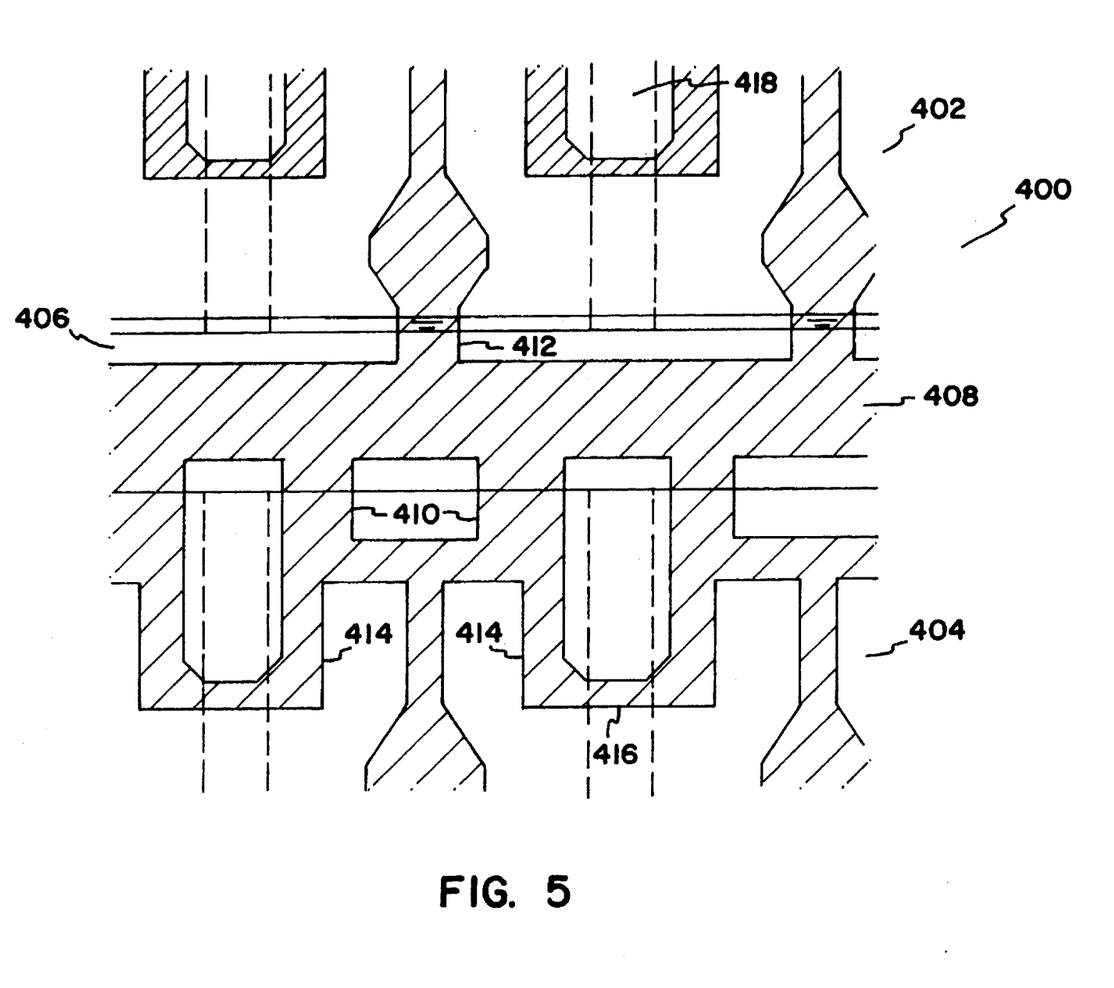
FIG. 5 is a layout for creating a negative pressure, pico size ABS slider design according to the present invention.

FIG. 5 illustrates the layout for creating a negative pressure, pico size ABS slider design 400. Again, only portions of two adjacent rows 402, 404 are shown positioned in the carrier 406. The sacrificial structure 408 on the carrier 406 provides support to the leading edge rails 410, as well as the rear rail 412. The side rails 414 are supported by sacrificial structures 416 which extend into slider parting cut area 418.

Figure 6:
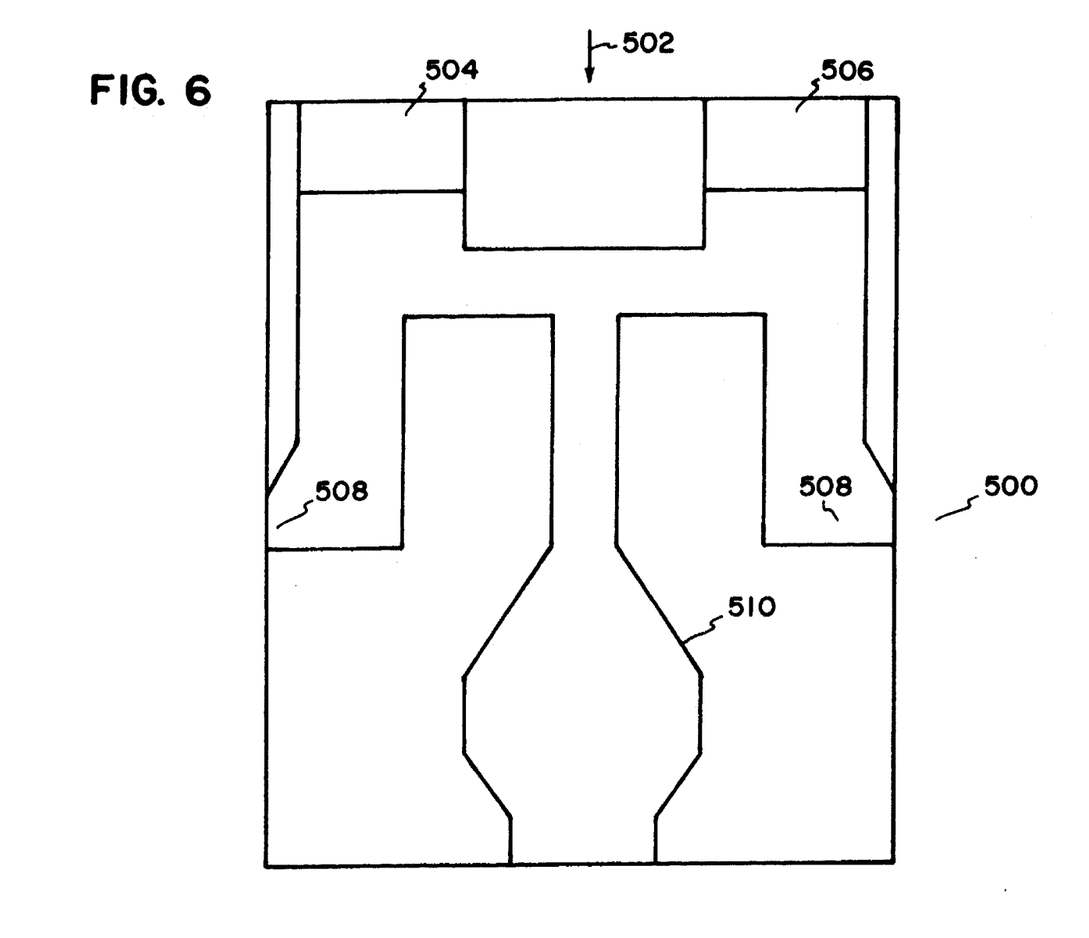
FIG. 6 is an example of a slider fabricated by the method of FIG. 5.

FIG. 6 shows a slider 500 created according to the negative pressure, pico size ABS design discussed with reference to FIG. 5. Arrow 502 illustrates the direction of air flow over the slider 500. Areas 504, 506 have been machined at an angle to facilitate air moving underneath and across the slider surface. Areas 508 create negative pressure which acts to hold the slider close to the surface of the disk as the platter rotates. Positive pressure, which lifts the slider away from the platter surface thereby enabling the slider to glide over the moving air, is created by pad 510.

Figure 7:
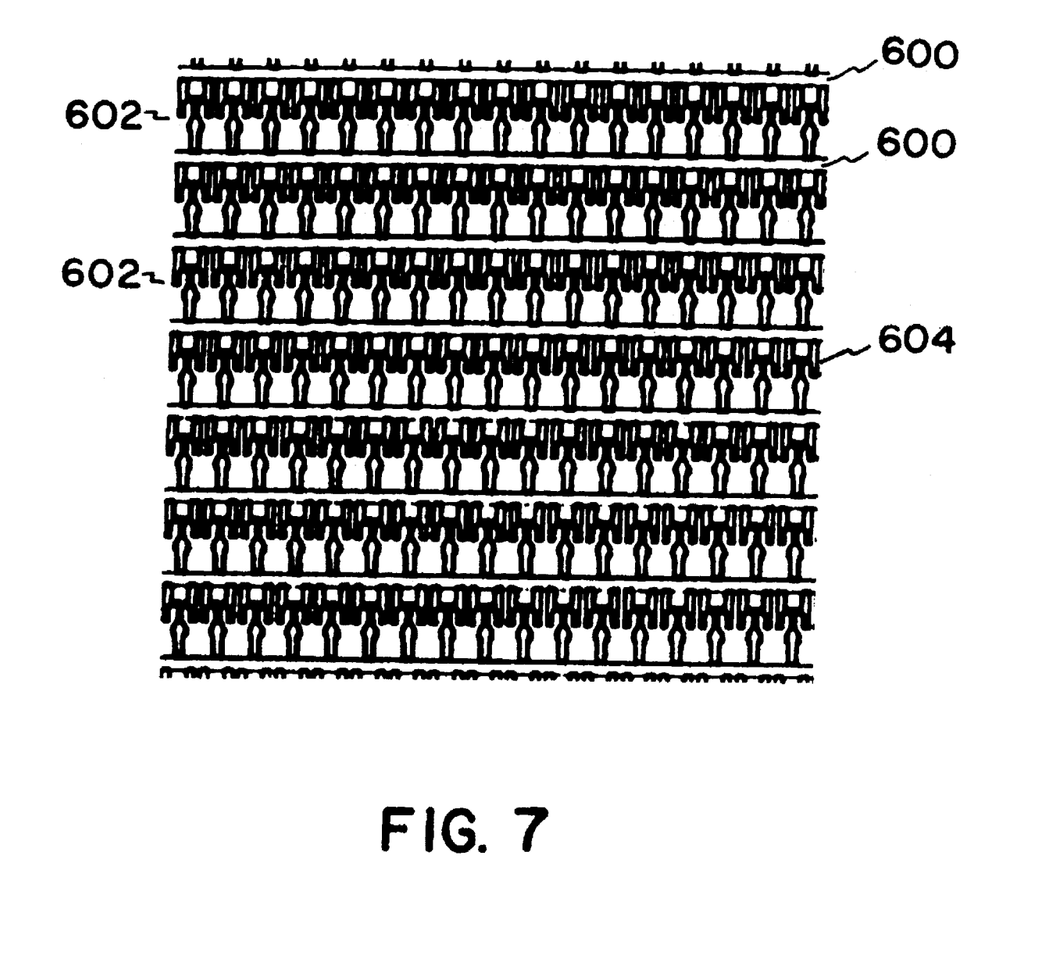
FIG. 7 illustrates a carrier containing rows of sliders fabricated by the method of FIG. 5.

Finally, FIG. 7 illustrates a carrier 600 containing multiple slider rows 602 having ABS designs 604 etched thereon.

Although specific embodiments have been illustrated and described herein, it will be appreciated by those or ordinary skill in the art that any arrangement that is calculated to achieve the same purpose may be substituted for the specific embodiments shown. The foregoing description of the preferred embodiments of the invention have been presented for the purposes of illustration and description. They are not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for defining small features on a transducer carrying slider, comprising the steps of:

exposing a mask, the mask having a larger sacrificial structure portion and a desired feature portion; and removing a sacrificial structure formed by the sacrificial structure portion of the mask after the desired feature is formed.

2. The method of claim 1 wherein the sacrificial structure and desired feature are formed on a row of sliders.

3. The method of claim 1 wherein the sacrificial structure portion of the mask is positioned on a carrier holding a row of sliders.

4. The method of claim 1 wherein the mask further comprises a connecting portion linking the desired feature portion and the sacrificial structure portion.

5. The method of claim 1 wherein the mask comprises a photoresist.

6. The method of claim 1 wherein the mask comprises a film of metal material.

7. A method for fabricating a transducer carrying slider, comprising the steps of:

positioning a mask over a row of sliders, the mask having a sacrificial structure portion, a feature portion, and a connecting portion linking the feature portion and the sacrificial structure portion;

exposing the slider row and mask to form the feature, connector and sacrificial structure;

etching an unexposed area of the slider row to remove the unexposed area; and removing the sacrificial structure.

8. The method of claim 7 wherein the sacrificial structure portion of the mask is positioned on a carrier holding the a row of sliders.

9. The method of claim 7 wherein the mask comprises a photoresist.

10. The method of claim 7 wherein the mask comprises a film of metal material.

11. A method for defining small features during the fabrication of transducer carrying sliders, comprising the steps of:

mounting a plurality of slider rows in a carrier, the carrier holding the slider rows in parallel;

positioning a mask on the slider rows, the mask having a pattern for forming a sacrificial structure, a desired feature, and connectors linking the sacrificial structure and the desired features;

exposing the mask to transfer the pattern to the slider rows;

etching the slider row surface to form the pattern; and removing the sacrificial structure.

12. The method of claim 11 wherein the desired features comprise both positive and negative pressure areas.

13. The method of claim 11 wherein the step of removing the sacrificial structure further comprises the steps of:

positioning deep etching masks solely over the desired features thereby leaving a central exposed area;

exposing the slider rows to prepare the central exposed area for removal;

performing a deep etching of the central exposed area to form a central recess area thereby removing the sacrificial structure.

14. The method of claim 11 wherein the sacrificial structure is positioned over the carrier and along a cut zone.

15. The method of claim 14 wherein the step of removing the sacrificial structure further comprises the steps of:

etching the sacrificial structure off of the carrier; and cutting the slider row along the cut zone thereby forming individual sliders and eliminating the sacrificial structure along the cut zone.

16. The method of claim 15 wherein the desired features comprise both positive and negative pressure areas.

17. A disk drive system comprising at least one storage disk, means for rotating the storage disk, and a positional head assembly having a transducer carrying slider, the slider fabricated by a process comprising the steps of:

mounting a plurality of slider rows in a carrier, the carrier holding the slider rows in parallel;

positioning a mask on the slider rows, the mask having a pattern for forming a sacrificial structure, a desired feature, and connectors linking the sacrificial structure and the desired features;

exposing the mask to transfer the pattern to the slider rows;

etching the slider row surface to form the pattern; and removing the sacrificial structure.

18. The disk drive system of claim 17 wherein the desired features comprise both positive and negative pressure areas.

19. The disk drive system of claim 17 wherein the step of removing the sacrificial structure further comprises the steps of:

positioning deep etching masks solely over the desired features thereby leaving a central exposed area;

exposing the slider rows to prepare the central exposed area for removal;

performing a deep etching of the central exposed area to form a central recess area thereby removing the sacrificial structure.

20. The disk drive system of claim 17 wherein the sacrificial structure is positioned over the carrier and along a cut zone.

21. The disk drive system of claim 20 wherein the step of removing the sacrificial structure further comprises the steps of:

etching the sacrificial structure off of the carrier; and cutting the slider row along the cut zone thereby forming individual sliders and eliminating the sacrificial structure along the cut zone.

22. The disk drive system of claim 21 wherein the desired features comprise both positive and negative pressure areas.

* * * * *